US010628271B2

(12) United States Patent
Li

(10) Patent No.: US 10,628,271 B2
(45) Date of Patent: Apr. 21, 2020

(54) METHOD FOR INFORMATION PROCESSING AND RELATED DEVICE

(71) Applicant: Guangdong Oppo Mobile Telecommunications Corp., Ltd., Dongguan, Guangdong (CN)

(72) Inventor: Hui Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/435,303

(22) Filed: Jun. 7, 2019

(65) Prior Publication Data
US 2019/0294510 A1 Sep. 26, 2019

Related U.S. Application Data

(63) Continuation of application No. 16/122,383, filed on Sep. 5, 2018, which is a continuation-in-part of
(Continued)

(30) Foreign Application Priority Data
May 31, 2016 (CN) .......................... 2016 1 0380681

(51) Int. Cl.
G06F 11/14 (2006.01)
G06F 16/16 (2019.01)
(Continued)

(52) U.S. Cl.
CPC ............ *G06F 11/1469* (2013.01); *G06F 1/32* (2013.01); *G06F 8/447* (2013.01); *G06F 9/4552* (2013.01);
(Continued)

(58) Field of Classification Search
CPC ................................................... G06F 11/1469
See application file for complete search history.

(56) References Cited

U.S. PATENT DOCUMENTS

2002/0112158 A1 8/2002 Golchikov
2014/0082597 A1 3/2014 Hassan Chati et al.
(Continued)

FOREIGN PATENT DOCUMENTS

CN 1729453 A 2/2006
CN 103914654 A 7/2014
(Continued)

OTHER PUBLICATIONS

Extended European search report issued in corresponding European application No. 17805844.2 dated Feb. 12, 2019.
(Continued)

*Primary Examiner* — Mohammad S Rostami
(74) *Attorney, Agent, or Firm* — Young Basile Hanlon & MacFarlane, P.C.

(57) ABSTRACT

A method for information processing is provided, which includes the follows. Whether a target OAT file corresponding to a target DEX file that an application relies on is missing is detected, in response to a start control instruction for the application detected. Existence of a backup target OAT file is detected when the target OAT file is missing. A hard-link file configured to back up the target OAT file is determined, and the target OAT file is read from the hard-link file, when the backup target OAT file exists. Validity of the target OAT file is verified. The target OAT file is loaded when the target OAT file is valid.

20 Claims, 6 Drawing Sheets

Related U.S. Application Data application No. PCT/CN2017/086562, filed on May 31, 2017.

(51) Int. Cl.

| | | |
|---|---|---|
| *G06F 16/174* | (2019.01) | |
| *G06F 16/23* | (2019.01) | |
| *G06F 1/32* | (2019.01) | |
| *G06F 9/455* | (2018.01) | |
| *G06F 8/41* | (2018.01) | |

(52) U.S. Cl.
CPC ........ *G06F 16/162* (2019.01); *G06F 16/1744* (2019.01); *G06F 16/2365* (2019.01); *G06F 2201/82* (2013.01)

(56) References Cited

U.S. PATENT DOCUMENTS

| | | | |
|---|---|---|---|
| 2014/0245027 A1* | 8/2014 | Lee | G06F 21/74 713/193 |
| 2015/0269052 A1* | 9/2015 | Huang | G06F 11/3409 717/140 |
| 2017/0220335 A1* | 8/2017 | Pink | G06F 9/44536 |
| 2017/0242716 A1* | 8/2017 | Chung | G06F 9/45525 |
| 2017/0262656 A1* | 9/2017 | Salmon-Legagneur | G06F 11/1004 |
| 2017/0269950 A1* | 9/2017 | Lu | G06F 8/41 |
| 2017/0270319 A1* | 9/2017 | Salmon-Legagneur | G06F 11/1004 |
| 2018/0157808 A1* | 6/2018 | Jeon | G06F 21/12 |

FOREIGN PATENT DOCUMENTS

| | | |
|---|---|---|
| CN | 104965712 A | 10/2015 |
| CN | 105278989 A | 1/2016 |
| CN | 105303072 A | 2/2016 |
| CN | 105468428 A | 4/2016 |

OTHER PUBLICATIONS

Anonymous, Android Runtime—Wikipedia, May 23, 2016, pp. 1-2.
SungHyun Hong, Client Ahead-Of-Time Compiler for App-Downloading Systems, Jul. 1, 2014, section 4.1 figures 4-1.
Anonymous, Hard link—Wikipedia, Mar. 2016, p. 1.
International search report issued in corresponding international application No. PCT/CN2017/086562 dated Aug. 29, 2017.
Rahul K. et al., Android: The Road to JIT/AOT Hybrid Compilation-Based Application User Experience, May 20, 016, pp. 1-6.

* cited by examiner

METHOD FOR INFORMATION PROCESSING AND RELATED DEVICE

CROSS-REFERENCE TO RELATED APPLICATION(S)

This application is a continuation of U.S. application Ser. No. 16/122,383, filed on Sep. 5, 2018, which is a continuation-in-part of International Application PCT/CN2017/086562, filed on May 31, 2017, which claims priority to Chinese Patent Application No. 201610380681.8, filed on May 31, 2016, the contents of all of which are hereby incorporated by reference in their entireties.

TECHNICAL FIELD

The present disclosure relates to the field of electronics, and more particularly, to a method for information processing and a related device.

BACKGROUND

In order to enhance the efficiency at runtime, some current mobile operating system (e.g., Android®) has fully replaced a Dalvik virtual machine with an ART virtual machine. Before running an application, since the running efficiency of an OAT file is higher than that of a DEX file, the DEX executable file in an application can be compiled into an OAT file with a dex2oat tool in advance, where the OAT file is a set of compiled local machine instructions. In general, some main compilations are performed during the installation of an application, other compilations are performed during the runtime of the application that relies on dynamic Java library files, where the Java library files are also required to be compiled into OAT files before running. Currently, for many popular applications, such as Angry Birds, Subway Park, Temple Escape, etc., dynamic libraries are compiled and loaded at each cold start, thereby increasing the power consumption of the terminals.

SUMMARY

Implementations of the present disclosure provide a method for information processing and a related device.

According to a first aspect, there is provided a method for information processing, which includes the following.

Whether a target OAT file corresponding to a target DEX file that an application relies on is missing is detected, in response to a start control instruction for the application detected. Existence of a backup target OAT file is detected when the target OAT file is missing. A hard-link file configured to back up the target OAT file is determined, and the target OAT file is read from the hard-link file, when the backup target OAT file exists. Validity of the target OAT file is verified. The target OAT file is loaded when the target OAT file is valid. Verifying validity of the target OAT file includes: determining whether the number of offset arrays of the target OAT file is equal to that of data types of the target DEX file; determining that the target OAT file is valid based on a determination that the number of the offset arrays of the target OAT file is equal to that of the data types of the target DEX file; determining that the target OAT file is invalid based on a determination that the number of the offset arrays of the target OAT file is not equal to that of the data types of the target DEX file.

According to a second aspect, there is provided a method for information processing, which includes the following.

Whether a target OAT file corresponding to a target DEX file that an application relies on is missing is detected, in response to a start control instruction for the application detected. Existence of a backup target OAT file is detected when the target OAT file is missing. A hard-link file configured to back up the target OAT file is determined, and the target OAT file is read from the hard-link file, when the backup target OAT file exists. Validity of the target OAT file is verified. The target OAT file is loaded when the target OAT file is valid. Whether the target OAT file is complete is determined when the target OAT file is invalid. Uncompiled target data of the target DEX file is determined and target compiled data is obtained by compiling the uncompiled target data, based on a determination that the target OAT file is incomplete. The target compiled data is added into the target OAT file and the target OAT file is loaded.

According to a third aspect, there is provided a terminal, which includes at least one processor and a computer readable storage coupled to the at least one processor. The computer readable storage stores at least one computer executable instruction thereon, which when executed by the at least one processor, cause the at least one processor to carry out actions, including: detecting whether a target OAT file corresponding to a target DEX file that an application relies on is missing, in response to a start control instruction for the application detected; detecting existence of a backup target OAT file when the target OAT file is missing; determining a hard-link file configured to back up the target OAT file and reading the target OAT file from the hard-link file, when the backup target OAT file exists; verifying validity of the target OAT file; loading the target OAT file when the target OAT file is valid. The at least one processor carrying out the action of verifying validity of the target OAT file is caused to carry out actions, including: determining whether the number of offset arrays of the target OAT file is equal to that of data types of the target DEX file; determining that the target OAT file is valid based on a determination that the number of the offset arrays of the target OAT file is equal to that of the data types of the target DEX file; determining that the target OAT file is invalid based on a determination that the number of the offset arrays of the target OAT file is not equal to that of the data types of the target DEX file.

These and other aspects of the present disclosure will be more concise and easy to understand in the description of the following implementations.

BRIEF DESCRIPTION OF DRAWINGS

To illustrate the technical solutions embodied by the implementations of the present disclosure or by the related art more clearly, the following briefly introduces the accompanying drawings required for describing the implementations or the related art. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Figure 1A:
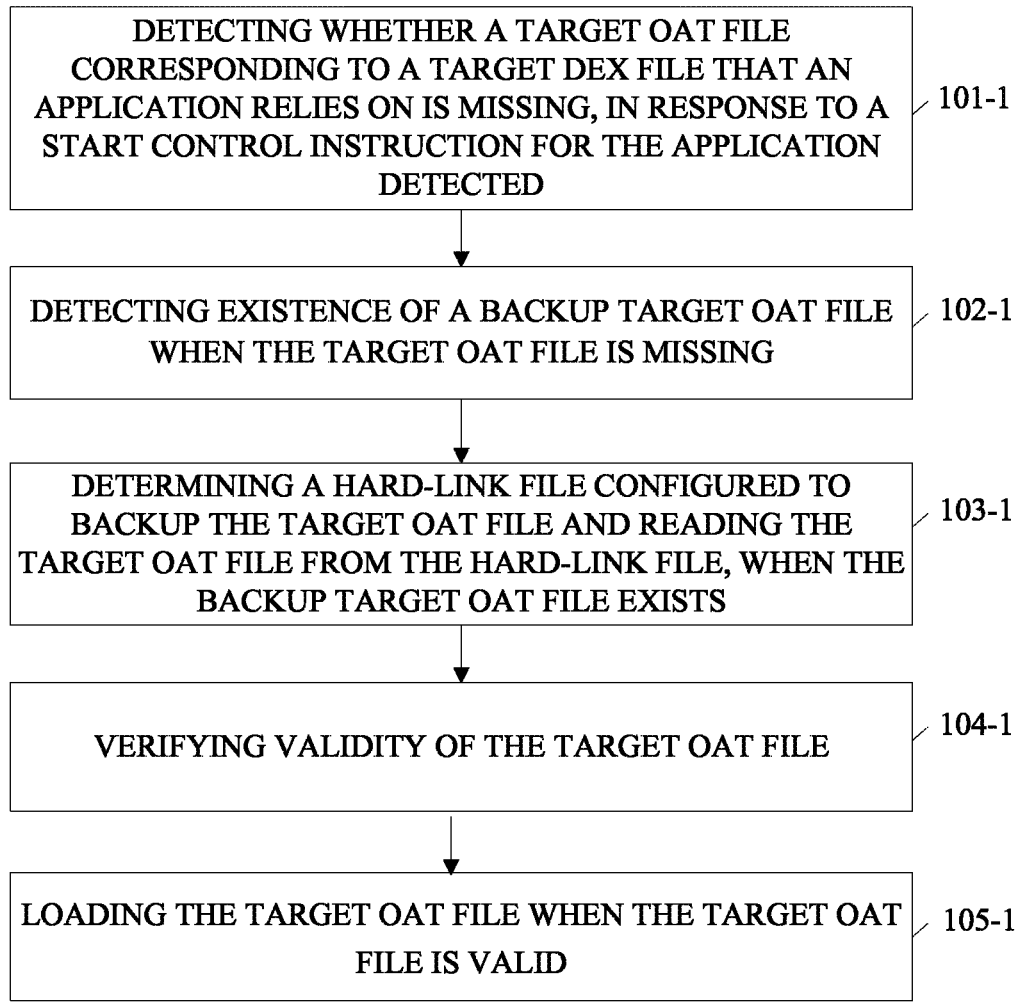
FIG. 1A is a schematic flow chart of a method for information processing according to an implementation of the present disclosure.

Technical solutions in the implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The following are described in detail.

The terms "first", "second", "third", and "fourth" used in the specification, the claims, and the accompanying drawings of the present disclosure are used for distinguishing between different objects rather than describing a particular order. The terms "include", "comprise", and "have" as well as variations thereof are intended to cover non-exclusive inclusion. For example, a process, method, system, product, device, or apparatus including a series of steps or units is not limited to the listed steps or units, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

Hereinafter, some terms of the present disclosure will be explained and interpreted to facilitate understanding by those skilled in the art.

"Terminals", also known as user equipments (UE), are devices that provide voice and/or data connectivity to a user, for example, handheld devices having wireless connection functions, in-vehicle devices, and the like. Common terminals include, for example, mobile phones, tablets, laptops, palmtops, mobile internet devices (MID), wearable devices such as smart watches, smart bracelets, pedometers, and the like.

A DEX file, executed by the Dalvik virtual machine, refers to an executed program in the Android® operating system. As one implementation, the DEX file can refer to a dynamic Java library file. An OAT file is a set of local machine instructions obtained by compiling the DEX file with the dex2oat tool. An application is one of a third-party application installed in a terminal and a system application.

"Multiple" means two or more. "And/or" describes the relationship of associated objects, and indicates that there may be three kinds of relationships, for example, "A and/or B" may indicate that A exists alone, A and B exist simultaneously, and B exists alone. The character "/" generally indicates that the associated objects are in a "or" relationship.

According to a first aspect of implementations of the present disclosure, there is provided a method for information processing. The method includes: detecting whether a target OAT file corresponding to a target DEX file that an application relies on is missing, in response to a start control instruction for the application detected; detecting existence of a backup target OAT file when the target OAT file is missing; determining a hard-link file configured to back up the target OAT file and reading the target OAT file from the hard-link file, when the backup target OAT file exists; loading the target OAT file.

In an implementation, the method further includes: verifying validity of the target OAT file; conducting the loading the target OAT file when the target OAT file is valid.

In an implementation, the method further includes: obtaining and loading the target OAT file by compiling the target DEX file, when the backup target OAT file does not exist.

In an implementation, the method further includes: establishing the hard-link file configured to back up the target OAT file and storing the target OAT file into the hard-link file corresponding to the target OAT file.

In an implementation, the verifying validity of the target OAT file includes: determining whether the number of offset arrays of the target OAT file is equal to that of data types of the target DEX file; determining that the target OAT file is valid based on a determination that the number of the offset arrays of the target OAT file is equal to that of the data types of the target DEX file; determining that the target OAT file is invalid based on a determination that the number of the offset arrays of the target OAT file is not equal to that of the data types of the target DEX file.

In an implementation, the method further includes: determining whether the target OAT file is complete when the target OAT file is invalid; determining uncompiled target data of the target DEX file and obtaining target compiled data by compiling the uncompiled target data, based on a determination that the target OAT file is incomplete; adding the target compiled data into the target OAT file and loading the target OAT file.

In an implementation, the method further includes: deleting the backup target OAT file from the hard-link file corresponding to the target OAT file when the application has been updated or uninstalled.

In an implementation, the method further includes: obtaining a compressed file by compressing the target OAT file and storing the compressed file at a specified location, when the application has been updated or uninstalled; deleting the compressed file when the application has not been reinstalled in a preset time period.

In an implementation, the target OAT file is a set of local machine instructions obtained by compiling the target DEX file with a dex2oat tool.

In an implementation, the application is one of a third-party application installed in a terminal and a system application.

In an implementation, the target DEX file is a program executed by a Dalvik virtual machine in an Android® operating system.

According to a second aspect of implementations of the present disclosure, there is provided a terminal, including: at least one processor, and a computer readable storage, coupled to the at least one processor and storing at least one computer executable instruction thereon, which when executed by the at least one processor, cause the at least one processor to carry out actions, including: detecting whether a target OAT file corresponding to a target DEX file that an application relies on is missing, in response to a start control instruction for the application detected; detecting existence of a backup target OAT file when the target OAT file is missing; determining a hard-link file configured to back up the target OAT file and reading the target OAT file from the hard-link file, when the backup target OAT file exists; loading the target OAT file.

In an implementation, the at least one processor is further caused to carry out actions, comprising: verifying validity of the target OAT file; conducting the loading the target OAT file when the target OAT file is valid.

In an implementation, the at least one processor is further caused to carry out actions, including: obtaining and loading the target OAT file by compiling the target DEX file, when the backup target OAT file does not exist.

In an implementation, the at least one processor is further caused to carry out actions, including: establishing the hard-link file configured to back up the target OAT file and storing the target OAT file into the hard-link file corresponding to the target OAT file.

In an implementation, the at least one processor carrying out the action of verifying validity of the target OAT file is caused to carry out actions, including: determining whether the number of offset arrays of the target OAT file is equal to that of data types of the target DEX file; determining that the target OAT file is valid based on a determination that the number of the offset arrays of the target OAT file is equal to that of the data types of the target DEX file; determining that the target OAT file is invalid based on a determination that the number of the offset arrays of the target OAT file is not equal to that of the data types of the target DEX file.

In an implementation, the at least one processor is further caused to carry out actions, including: determining whether the target OAT file is complete when the target OAT file is invalid; determining uncompiled target data of the target DEX file and obtaining target compiled data by compiling the uncompiled target data, based on a determination that the target OAT file is incomplete; adding the target compiled data into the target OAT file and loading the target OAT file.

In an implementation, the at least one processor is further caused to carry out actions, including: deleting the backup target OAT file from the hard-link file corresponding to the target OAT file when the application has been updated or uninstalled.

In an implementation, the at least one processor is further caused to carry out actions, including: obtaining a compressed file by compressing the target OAT file and storing the compressed file at a specified location, when the application has been updated or uninstalled; deleting the compressed file when the application has not been reinstalled in a preset time period.

According to a third aspect of implementations of the present disclosure, there is provided a non-transitory computer-readable storage medium storing a computer program which, when executed by a processor, causes the processor to carry out actions: detecting whether a target OAT file corresponding to a target DEX file that an application relies on is missing, in response to a start control instruction for the application detected; detecting existence of a backup target OAT file when the target OAT file is missing; determining a hard-link file configured to back up the target OAT file and reading the target OAT file from the hard-link file, when the backup target OAT file exists; verifying validity of the target OAT file; loading the target OAT file when the target OAT file is valid.

In an implementation, the computer program is further executed by the processor to carry out actions: obtaining and loading the target OAT file by compiling the target DEX file, when the backup target OAT file does not exist; establishing the hard-link file configured to back up the target OAT file and storing the target OAT file into the hard-link file corresponding to the target OAT file.

In an implementation, the computer program executed by the processor to carry out the action of verifying validity of the target OAT file is executed by the processor to carry out actions, comprising: determining whether the number of offset arrays of the target OAT file is equal to that of data types of the target DEX file; determining that the target OAT file is valid based on a determination that the number of the offset arrays of the target OAT file is equal to that of the data types of the target DEX file; determining that the target OAT file is invalid based on a determination that the number of the offset arrays of the target OAT file is not equal to that of the data types of the target DEX file.

In an implementation, the computer program is further executed by the processor to carry out actions: determining whether the target OAT file is complete when the target OAT file is invalid; determining uncompiled target data of the target DEX file and obtaining target compiled data by compiling the uncompiled target data, based on a determination that the target OAT file is incomplete; adding the target compiled data into the target OAT file and loading the target OAT file.

FIG. 1A is a schematic flow chart of a method for information processing according to an implementation of the present disclosure, the method begins at block 101.

At block 101-1, whether a target OAT file corresponding to a target DEX file that an application relies on is missing is detected, in response to a start control instruction for the application detected.

At block 102-1, existence of a backup target OAT file is detected when the target OAT file is missing.

At block 103-1, a hard-link file configured to back up the target OAT file is determined, and the target OAT file is read from the hard-link file, when the backup target OAT file exists.

At block 104-1, validity of the target OAT file is verified.

At block 105-1, the target OAT file is loaded when the target OAT file is valid.

validity of the target OAT file is verified as follows.

Whether the number of offset arrays of the target OAT file is equal to that of data types of the target DEX file is determined. The target OAT file is determined to be valid based on a determination that the number of the offset arrays of the target OAT file is equal to that of the data types of the target DEX file. The target OAT file is determined to be invalid based on a determination that the number of the offset arrays of the target OAT file is not equal to that of the data types of the target DEX file.

As one implementation, the method further includes the following. When the backup target OAT file does not exist, the target OAT file is obtained by compiling the target DEX file and the target OAT file is loaded. The hard-link file configured to back up the target OAT file is established and the target OAT file is stored into the hard-link file corresponding to the target OAT file.

As one implementation, the method further includes the following. Whether the target OAT file is complete is determined when the target OAT file is invalid. Uncompiled target data of the target DEX file is determined and target compiled data is obtained by compiling the uncompiled target data, based on a determination that the target OAT file is incomplete. The target compiled data is added into the target OAT file and the target OAT file is loaded.

As one implementation, the method further includes the following. When the application has been updated or uninstalled, the backup target OAT file is deleted from the hard-link file corresponding to the target OAT file.

Figure 1B:
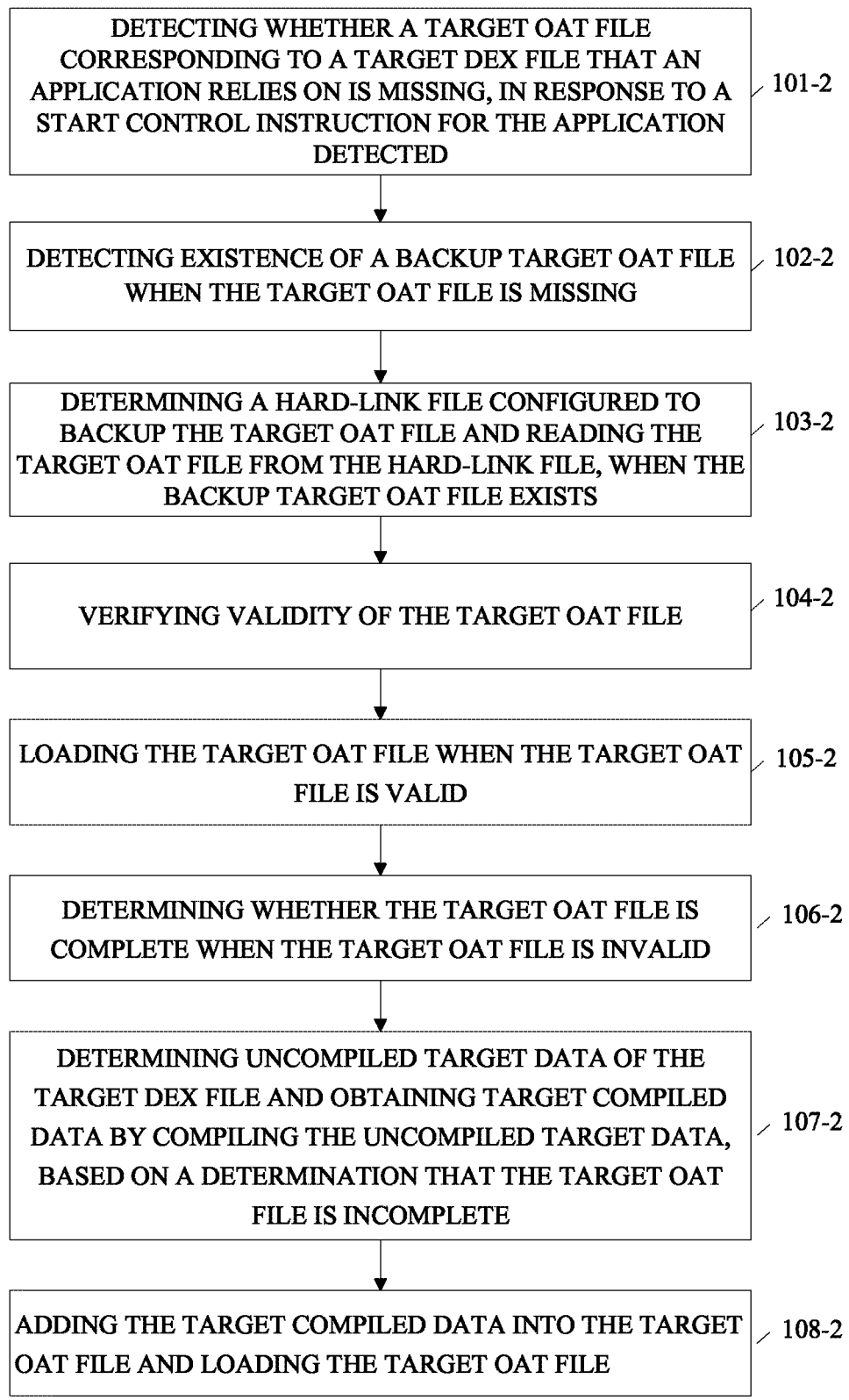
FIG. 1B is a schematic flow chart of a method for information processing according to an implementation of the present disclosure.

FIG. 1B is a schematic flow chart of a method for information processing according to an implementation of the present disclosure.

At block 101-2, whether a target OAT file corresponding to a target DEX file that an application relies on is missing is detected, in response to a start control instruction for the application detected.

At block 102-2, Existence of a backup target OAT file is detected when the target OAT file is missing.

At block 103-2, A hard-link file configured to back up the target OAT file is determined, and the target OAT file is read from the hard-link file, when the backup target OAT file exists.

At block 104-2, Validity of the target OAT file is verified.

At block 105-2, The target OAT file is loaded when the target OAT file is valid.

At block 106-2, Whether the target OAT file is complete is determined when the target OAT file is invalid.

At block 107-2, Uncompiled target data of the target DEX file is determined and target compiled data is obtained by compiling the uncompiled target data, based on a determination that the target OAT file is incomplete.

At block 108-2, The target compiled data is added into the target OAT file and the target OAT file is loaded.

As one implementation, the method further includes the following. The target OAT file is obtained by compiling the target DEX file and the target OAT file is loaded, when the backup target OAT file does not exist. The hard-link file configured to back up the target OAT file is established and the target OAT file is stored into the hard-link file corresponding to the target OAT file.

As one implementation, the method further includes the following. The backup target OAT file is deleted from the hard-link file corresponding to the target OAT file when the application has been updated or uninstalled.

Figure 1C:
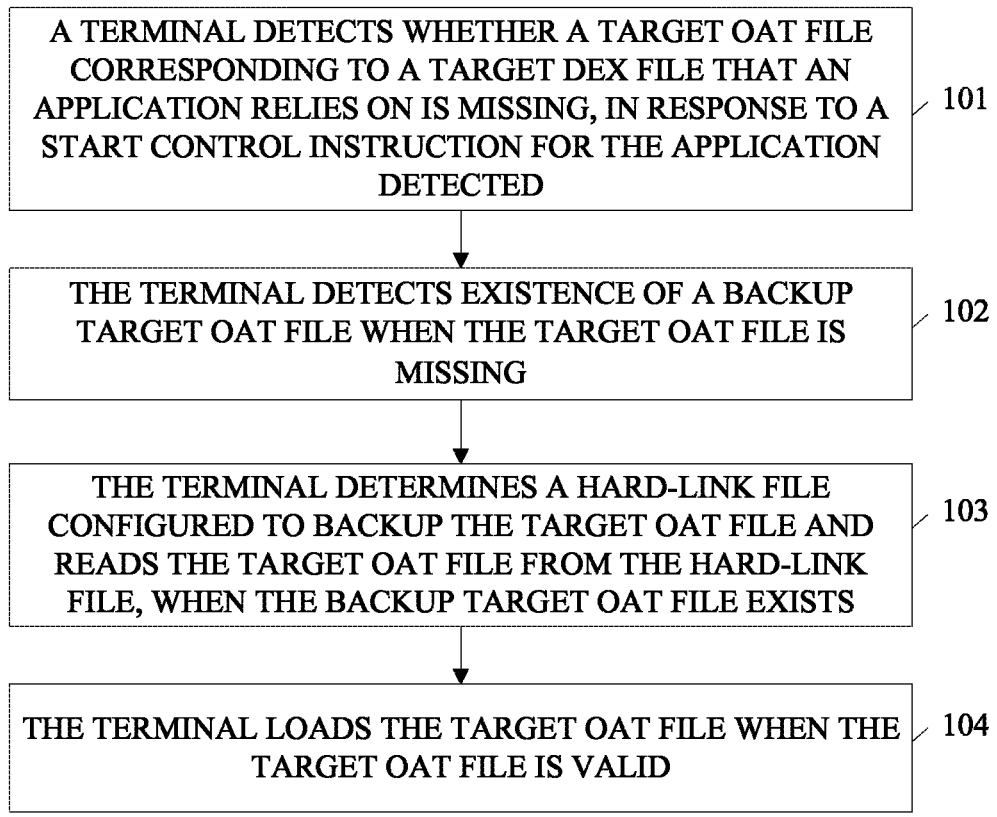
FIG. 1C is a schematic flow chart of a method for information processing according to an implementation of the present disclosure.

FIG. 1C is a schematic flow chart of a method for information processing according to an implementation of the present disclosure, the method begins at block 101.

At block 101, a terminal detects whether a target OAT file corresponding to a target DEX file on which an application relies is missing, in response to a start control instruction for the application detected.

At block 102, the terminal detects existence of a backup target OAT file when the target OAT file is missing.

At block 103, the terminal determines a hard-link file configured to back up the target OAT file and reads the target OAT file from the hard-link file, when the backup target OAT file exists.

At block 104, the terminal loads the target OAT file.

As one implementation, the application is one of a third-party application installed in a terminal and a system application.

As one implementation, the start control instruction is configured to control the application when the application is started for the first time, or the application is restarted after the application is killed.

For example, generally, some main compilations are performed during the installation of an application, other compilations are performed during the runtime of the application that relies on dynamic Java library files, where the dynamic Java library files are also required to be compiled into a set of local machine instructions (i.e., OAT files) before running. Currently, for many popular applications, such as Angry Birds, Metro Park, Temple Run, etc., dynamic Java library files are compiled and loaded at each cold start. It should be noted that, the "cold start" refers to a situation that the application is started for the first time, or that the application is restarted after the application is killed (i.e., not exists in memory). Generally, the OAT files, corresponding to the dynamic Java library files compiled at the time of application startup are located in caches. The compiled OAT files will be deleted when the application has been loaded, such that the compilation of dynamic Java library files will be re-executed at each cold start, thereby increasing the power consumption of the terminal.

In this implementation, prior to compiling the target DEX file (such as a dynamic Java library file) into the target OAT file, a determination may be made whether a backup target OAT file in the terminal exists. When the back target OAT file exists, the terminal may directly call the target OAT file from the hard-link file corresponding to the target OAT file instead of compiling the target DEX file at each cold start. Compiling is a time-consuming and power-consuming operation, which not only affects starting time of the application, but also affects starting power-consumption of the application. By means of the method for information processing, repeated compilation at each cold start can be avoided effectively, the loading time of the DEX file can be shortened, and power consumption at startup can be reduced.

As one implementation, the method illustrated in FIG. 1C further includes the following.

The terminal obtains the target OAT file by compiling the target DEX file, when the backup target OAT file does not exist. The terminal establishes the hard-link file configured to back up the target OAT file and stores the target OAT file into the hard-link file corresponding to the target OAT file.

For example, in a case that the backup target does not exist, which may occur when the application is installed and started for the first time, it is necessary for the terminal to obtain the target OAT file by compiling the target DEX file, and to load the target OAT file (alternatively, prior to loading the target OAT file, the terminal may first verify the validity of the target OAT file, and then load the target OAT file when the target OAT file is valid).

In addition, in order to avoid compiling these target DEX files repeatedly when subsequently starting the application and increasing the power consumption of the terminal, the terminal may backup the target OAT file. The target OAT file can be backed up as follows. First establish the hard-link file configured to back up the target OAT file, and then store the target OAT file into the hard-link file corresponding to the target OAT file.

As one implementation, the terminal can also verify validity of the target OAT file prior to loading the target OAT file. When the target OAT file is valid, the terminal can conduct the operation at block 104.

As one implementation, the over-identified operation of verifying the validity of the target OAT file includes the following. The terminal determines whether the number of offset arrays of the target OAT file is equal to that of data types of the target DEX file. The validity of the target OAT file will be determined based on a determination that the number of the offset arrays of the target OAT file is equal to that of the data types of the target DEX file. The invalidity of the target OAT file will be determined based on a determination that the number of the offset arrays of the target OAT file is not equal to that of the data types of the target DEX file.

For example, the DEX file usually includes N data types corresponding to N data, and the N data in turn correspond to N compiling methods. As such, the OAT file, obtained from compiling the N data in the DEX file by the terminal according to the N compiling methods, may include N offset arrays, and the N data are in one-to-one correspondence with the N offset arrays, where N is an integer greater than or equal to 1. N kinds of compiling methods may be the same or different, and it is not limited in the present disclosure. Therefore, the terminal can determinate the validity of the backup target OAT file by determining whether the number of the offset arrays in the backup target OAT file is equal to that of the data types in the target DEX file. For example, suppose the number of the offset arrays in the backup target OAT file is three, and the number of the data types in the target DEX file is three, then the terminal can determinate that the backup target OAT file is valid. Otherwise, the backup target OAT file is invalid.

As one implementation, the method illustrated in FIG. 1C further includes the following.

If the target OAT file is invalid, the terminal determinates whether the target OAT file is complete, and if the target OAT file is incomplete, the terminal then determinates uncompiled target data of the target DEX file and obtains target compiled data by compiling the uncompiled target data. Thereafter, the terminal adds the target compiled data into the target OAT file and loads the target OAT file.

For example, the reason why the target OAT file is invalid may be that the target OAT file is incomplete or for other reasons (such as the application has been updated). The cause of an incomplete OAT file may be that, the user closes the application during the application startup and therefore, it is impossible for the terminal to compile the target DEX file completely, thereby making the target oat file incomplete. The terminal determinates whether the target OAT file is complete when the target OAT file is invalid. If the target OAT file is incomplete, the terminal will complete the target OAT file before loading the target OAT file; alternatively, prior to loading the target OAT file, the terminal may first verify the validity of the target OAT file, and then load the target OAT file when the target OAT file is valid. The method for completing the target OAT file may include the following. The terminal first determinates uncompiled target data of the target DEX file and obtains target compiled data by compiling the uncompiled target data, and then the terminal adds the target compiled data into the target OAT file and loads the target OAT file. For example, the number of the offset arrays in the target OAT file is one and the number of the data types in the target DEX file is three, it indicates that there are two data types uncompiled in the target DEX file. The terminal can determinate what these two uncompiled data types are in the target DEX file through a compiling method corresponding to the one offset array in the target OAT file, and then the terminal obtains the target compiled data by compiling data corresponding to the two data types, and finally the terminal adds the target compiled data into the target OAT file so as to complete the target OAT file.

As one implementation, the method illustrated in FIG. 1C further includes the following.

The terminal may delete the backup target OAT file from the hard-link file corresponding to the target OAT file when the application has been updated or uninstalled.

For example, when the application has been updated or uninstalled, the terminal considers the backup target OAT file may be of less use in subsequent processes. In this case, the terminal, in order to save the storage space thereof, may delete the backup target OAT file in the application from the hard-link file corresponding to the target OAT file.

As another implementation, the method further includes the following.

The terminal may obtain a compressed file by compressing the target OAT file and store the compressed file at a specified location, when the application has been updated or uninstalled. The terminal may delete the compressed file when the application has not been reinstalled in a preset time period.

As one implementation, sometimes the user may temporarily uninstall an application A for releasing part of the storage space of the terminal, and may reinstall the application A under user needs subsequently. In this case, in order to avoid the terminal repeatedly compiling the target OAT file required by the application A, the terminal may obtain a compressed file B by compressing the target OAT file in the application A first, and then store the compressed file B at a specified location. The compressed file B can be decompressed as a backup when the user conducts a subsequent installation of the application A. The terminal will directly delete the compressed file when the application has not been reinstalled in a preset time period (such as one month).

Figure 2:
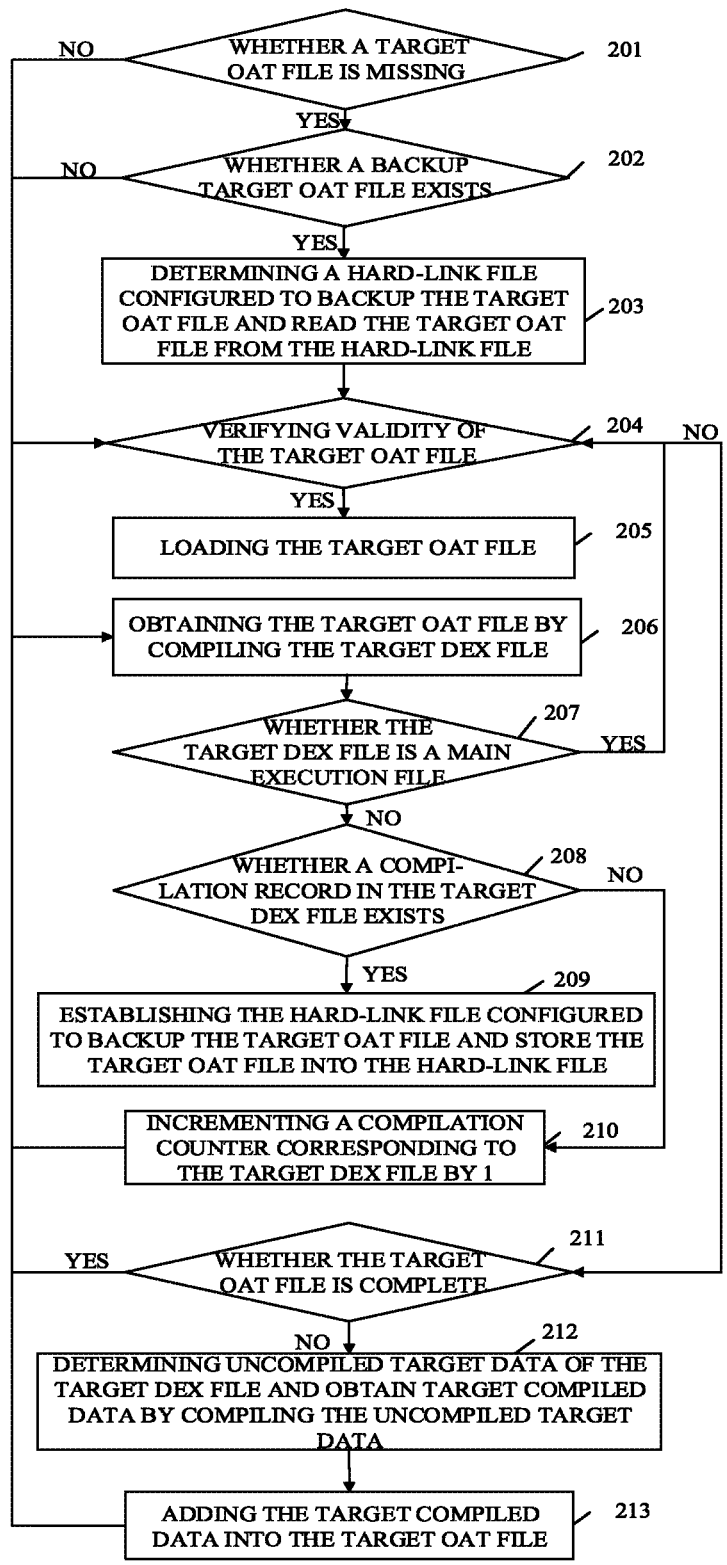
FIG. 2 is a schematic flow chart of another method for information processing according to an implementation of the present disclosure.

As illustrated in FIG. 2, the implementations of the present disclosure also provide another more detailed method, the method begins at block 201.

At block 201, the terminal detects whether a target OAT file corresponding to a target DEX file on which an application relies is missing, in response to a start control instruction for the application detected.

If the target OAT file is missing, the method may advance to block 202.

Otherwise, the method may advance to block 204.

At block 202, the terminal detects existence of a backup target OAT file.

If the backup target OAT file exists, the method may advance to block 203.

If the backup target OAT file does not exist, the method may advance to block 206.

At block 203, the terminal determinates a hard-link file configured to back up the target OAT file and reads the target OAT file from the hard-link file.

At block 204, the terminal verifies validity of the target OAT file.

If the target OAT file is invalid, the method may advance to block 205.

If the target OAT file is valid, the method may advance to block 211.

At block 205, the terminal loads the target OAT file.

At block 206, the terminal obtains the target OAT file by compiling the target DEX file.

At block 207, the terminal determinates whether the target DEX file is a main execution file.

If the target DEX file is a main execution file, the method may return to block 204.

Otherwise, the method may advance to block 208.

At block 208, the terminal detects existence of compilation record in the target DEX file.

If the compilation record exists, the method may advance to block 209.

If the compilation record does not exist, the method may advance to block 210.

At block 209, the terminal establishes the hard-link file configured to back up the target OAT file and stores the target OAT file into the hard-link file corresponding to the target OAT file.

At block 210, the terminal increments a compilation counter corresponding to the target DEX file by one. When the functions of block 210 have been performed, the method may return to block 204.

At block 211, the terminal determinates whether the target OAT file is complete.

If yes, the method may advance to block 212.

If not, the method may return to block 206.

At block 212, the terminal determines uncompiled target data of the target DEX file and obtains target compiled data by compiling the uncompiled target data.

At block 213, the terminal adds the target compiled data into the target OAT file. When the functions of block 213 have been performed, the method may return to block 204.

It should be noted that, the specific implementation manner of each block illustrated in FIG. 2 may refer to that of the over-identified method and will not be described again herein. In addition, after the operations at block 206, the method may advance to block 207, or may return to block 204 or block 205. Furthermore, operations at block 207 are configured to ensure that the target DEX file is not a main execution file (a main execution file in an application, refers to a file placed under a directory of/data/app, and is not capable of being repeatedly compiled). At block 208, the terminal further verifies the existence of compilation record corresponding to the target DEX file, and the existence of one compilation record indicates that there has been one compilation already and this behavior is a secondary compilation, that is, it complies with the characteristics of repeated compilation. At block 210, a compilation counter corresponding to the target DEX file is incremented by one to update the compilation record content, to facilitate the terminal to subsequently determine whether the target DEX file has been compiled. For example, if the value of the compilation counter corresponding to the target DEX file is zero, it indicates that the target DEX file has not been compiled; on the other hand, if the value of the compilation counter corresponding the DEX file is not zero, it indicates that the target DEX file has been compiled.

In this implementation, prior to compiling the target DEX file (such as a dynamic Java library file) into the target OAT file, existence of a backup target OAT file in the terminal is determined. When the back target OAT file exists, the terminal may directly call the target OAT file from the hard-link file corresponding to the target OAT file instead of compiling the target DEX file at each cold start. Compiling is a time-consuming and power-consuming operation, which not only affects starting time of the application, but also affects starting power-consumption of the application. By means of the method for information processing, repeated compilation at each cold start can be avoided effectively, the loading time of the DEX file can be shortened, and power consumption at startup can be reduced.

Figure 3:
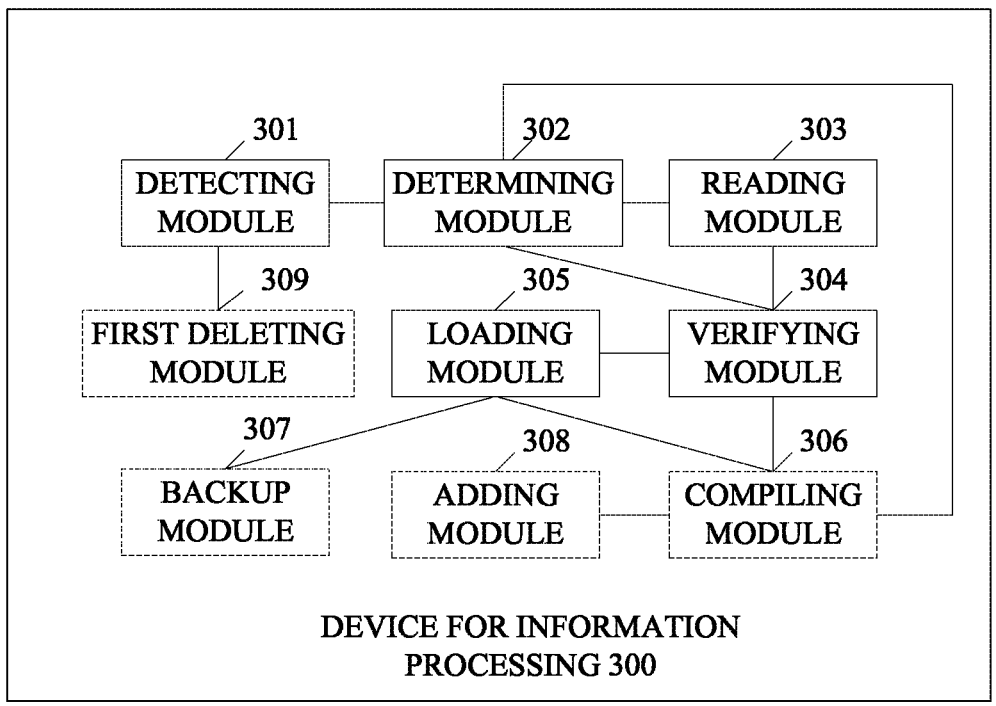
FIG. 3 is a schematic structure diagram of a device for information processing according to an implementation of the present disclosure.

As illustrated in FIG. 3, the present disclosure further provides a device for information processing, the device includes a detecting unit 301, a determining unit 302, a reading unit 303, a verifying unit 304, and a loading unit 305.

The detecting unit 301 is configured to detect whether a target OAT file corresponding to a target DEX file that an application relies on is missing, in response to a start control instruction for the application detected, and further configured to detect existence of a backup target OAT file exists when the target OAT file is missing.

The determining unit 302 is configured to determine a hard-link file configured to back up the target OAT file, when the backup target OAT file exists.

The reading unit 303 is configured to read the target OAT file from the hard-link file.

The verifying unit 304 is configured to verify validity of the target OAT file.

The loading unit 305 is configured to load the target OAT file when the target file is valid.

As one implementation, the device illustrated in FIG. 3 further includes a compiling unit 306 and a backup unit 307.

The compiling unit 306 is configured to obtain the target OAT file by compiling the target DEX file, when the backup target OAT file does not exist.

The loading unit 305 is further configured to load the target OAT file.

The backup unit 307 is configured to establish the hard-link file configured to back up the target OAT file, and to store the target OAT file into the hard-link file corresponding to the target OAT file.

As an implementation, the verifying unit 304 is configured to: determine whether the number of offset arrays of the target OAT file is equal to that of data types of the target DEX file; determine that the target OAT file is valid based on a determination that the number of the offset arrays of the target OAT file is equal to that of the data types of the target DEX file; and determine that the target OAT file is invalid based on a determination that the number of the offset arrays of the target OAT file is not equal to that of the data types of the target DEX file.

As an implementation, the determining unit 302 is further configured to determine whether the target OAT file is complete when the target OAT file is invalid, and to determine uncompiled target data of the target DEX file when the target OAT file is incomplete.

The compiling unit 306 is further configured to obtain target compiled data by compiling the uncompiled target data.

The device further includes an adding unit 308 configured to add the target compiled data into the target OAT file. The loading unit is further configured to load the target OAT file.

As an implementation, the device illustrated in FIG. 3 further includes a first deleting unit 309.

The first deleting unit 309 is configured to delete the backup target OAT file from the hard-link file corresponding to the target OAT file when the application has been updated or uninstalled.

As an implementation, the device illustrated in FIG. 3 further includes a compressing unit, a storing unit, and a second deleting unit.

The compressing unit is configured to obtain a compressed file by compressing the target OAT file, when the application has been updated or uninstalled;

The storing unit is configured to store the compressed file at a specified location.

The second deleting unit is configured to delete the compressed file when the application has not been reinstalled in a preset time period.

As an implementation, the target OAT file is a set of local machine instructions obtained by compiling the target DEX file with a dex2oat tool.

As an implementation, the application can be one of a third-party application installed in a terminal and a system application.

As an implementation, the target DEX file is a program executed by a Dalvik virtual machine in an Android® operating system.

It should be understood that the above-identified modules (the detecting unit 301, the determining unit 302, the reading unit 303, the verifying unit 304, the loading unit 305, the compiling unit 306, the backup unit 307, the adding unit 308, and the first deleting unit 309) are configured to execute corresponding operations of the above methods illustrated in FIGS. 1A, 1B, 1C and 2.

In this implementation, the terminal 300 is presented in the form of modules. The "module" herein may refer to an application-specific integrated circuit (ASIC), a processor and a memory that can execute one or more software or firmware programs, an integrated logic circuit, and/or other components that can achieve the above-described functions. In addition, the above-identified detecting unit 301, the determining unit 302, the reading unit 303, the verifying unit 304, the loading unit 305, the compiling unit 306, the backup unit 307, the adding unit 308, and the first deleting unit 309 are implemented by the processor 401 of the terminal illustrated in FIG. 4.

Figure 4:
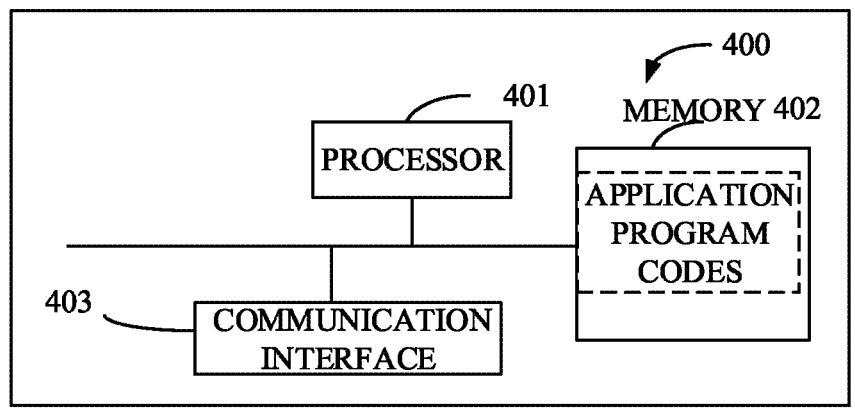
FIG. 4 is a schematic structure diagram of a terminal according to an implementation of the present disclosure.

As illustrated in FIG. 4, the terminal 400 may be implemented with the structure in FIG. 4, and the terminal 400 includes at least one processor 401, at least one memory 402, at least one communication interface 403. The processor 401, the memory 402, and the communication interface 403 are connected and communicated with each other through the communication bus.

The processor 401 can be a general-purpose central processing module (CPU), a microprocessor, an application-specific integrated circuit (ASIC), or one or more integrated circuits for controlling execution of program of the above schemes.

The communication interface 403 is configured to communicate with other devices or communication networks, such as an Ethernet, a radio access network (RAN), a wireless local area network (WLAN), and the like.

The memory 402 may be a read-only memory (ROM) or other types of static storage devices that can store static information and instructions, a random access memory (RAM) or other types of dynamic storage devices that can store information and instructions, or an electrically erasable programmable read-only memory (EEPROM), a compact disc read-only memory (CD-ROM), or other optical disk storage, optical disk storage (including compact discs, laser discs, optical discs, digital versatile discs, blue-ray discs, etc.), magnetic disk storage medium, or other magnetic storage devices, or any other mediums that can be used to carry or store desired program codes in the form of instructions or data structures and can be accessed by a computer. The disclosure is not limited thereto. The memory can be separated from the processor and connected to the processor via a bus. The memory can also be integrated with the processor.

The memory 402 is configured to store application program codes for executing the above schemes. The processor 401 is configured to execute the application program codes stored in the memory 402.

The code stored in the memory 402 can execute the process control method of FIGS. 1A, 1B, 1C and 2 performed by the terminal provided above, for example, detecting whether a target OAT file corresponding to a target DEX file that an application relies on is missing, in response to a start control instruction for the application detected; detecting existence of a backup target OAT file when the target OAT file is missing; determining a hard-link file configured to back up the target OAT file and reading the target OAT file from the hard-link file, when the backup target OAT file exists; verifying validity of the target OAT file; and loading the target OAT file when the target OAT file is valid.

The implementation of the present disclosure also provides a more specific application scenario, where the above-identified terminal is a mobile phone, and the various components of the mobile phone will be described in detail with reference to FIG. 5 as follows.

The RF circuit 510 may be configured to receive and transmit a signal during the process of sending or receiving information, or calling. In some possible implementations, the RF circuit 510 receives downlink information from a base-station and passes the downlink information to processors 580 for processing; furthermore, the RF circuit 510 sends data related to uplink to the base-station. Generally, the RF circuit 510 includes but is not limited to an antenna, at least one amplifier, a transceiver, a coupler, a low noise amplifier (LNA), a duplexer and the like. In addition, the RF circuit 510 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 520 is configured to store software programs and modules. The processor 580 is configured to execute various function applications and data processing of the mobile phone by running the software programs and the modules stored in the memory 520. The memory 520 mainly includes a program storage area and a data storage area. The program storage area may store an operating system, applications (such as file compilation function, file storage function, and file verification function, etc.,) required for at least one function and so on. The data storage area may store data (such as the backup target OAT file) created according to use of the mobile phone, and so on. In addition, the memory 520 may include a high-speed RAM, and may further include a non-volatile memory such as at least one disk storage device, a flash device, or other non-volatile solid storage devices.

The input unit 530 may be configured to receive input digital or character information and generate key signal input associated with user setting and functional control of the mobile phone. In some possible implementations, the input unit 530 may include a touch panel 531 and other input devices 532. The touch panel 531, also referred to a touch display screen, can collect a touch operation of the user on or near the touch panel 531 (such as an operation of user on or near the touch panel 531 with fingers, stylus and any other suitable objects or attachments) and drive a corresponding connection apparatus based on a pre-set form. In some possible implementations, the touch panel 531 can include two parts: a touch detecting apparatus and a touch controller. The touch detecting apparatus can detect a touch orientation of the user, detect a signal brought by the touch operation, and send the signal to the touch controller. The touch controller receives touch information from the touch detecting apparatus, converts the touch information into a touch coordinate, sends the touch information to the processor 580, and receives an order from the processor 580 to conduct it. In addition, the touch panel 531 can be implemented by resistance-type, capacitance-type, infrared ray, surface acoustic wave (SAW) and other types. The input unit 530 may further include, in addition to the touch panel 531, other input devices 532. The other input devices 532 may include, but are not limited to, one or more of a physical keyboard, a functional key (such as a volume control key and a switch key), a track ball, a mouse, and an operating rod.

The display unit 540 may be configured to display information input by the user or information provided for the user or various menus of the mobile phone. The display unit 540 may include a display panel 541, and in some possible implementations, the display panel 541 may be configured in the form of a liquid crystal display (LCD), an organic light-emitting diode (OLED) and so on. In some possible implementations, the touch panel 531 can cover the display panel 541. After the touch panel 531 detects the touch operation on or near the touch panel 531 and sends the touch operation to the processor 580 to determine a type of a touch event, the then processor 580 provides an associated visual output on the display panel 541 base on the type of the touch event. In FIG. 5, although the touch panel 531 and the display panel 541 implement input and output functions by serving as two independent components, the touch panel 531 may be integrated with the display panel 541 to implement the input and output functions in some possible implementations.

The mobile phone may also include at least one sensor 550, such as a light sensor, a motion sensor, and other sensors. As one implementation, the light sensor may include an ambient light sensor and a proximity sensor, among which the ambient light sensor may adjust the brightness of the display panel 541 according to ambient lights. The proximity sensor may turn off the display panel 541 and/or backlight when the mobile phone reaches nearby the ear. As a kind of motion sensor, a accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related the applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, and it will not be repeated herein.

The audio circuit 560, a speaker 561, and a microphone 562 may provide an audio interface between the user and the mobile phone. The audio circuit 560 may convert the received audio data into electrical signals and transfer the electrical signals to the speaker 561; thereafter the speaker 561 converts the electrical signals into sound signals to output. On the other hand, the microphone 562 converts the received sound signals into electrical signals, which will be received and converted into audio data by the audio circuit 560 to output. The audio data is then processed and transmitted by the processor 581 via a RF circuit 510 to another mobile phone for example, or, the audio data is output to the memory 520 for further processing.

Wi-Fi belongs to a short-range wireless transmission technology. With aid of the Wi-Fi module 570, the mobile phone may assist the user in E-mail receiving and sending, webpage browsing, access to streaming media and the like. Wi-Fi provides users with wireless broadband Internet access. Although the Wi-Fi module 570 is illustrated in FIG. 5, it should be understood that the Wi-Fi module 570 is not essential to the mobile phone and can be omitted according to actual needs without departing from the essential nature of the present disclosure.

The processor 580 is a control center of the mobile phone, and is configured to connect all parts of the whole mobile phone by utilizing various interfaces and lines, to run or execute the software programs and/or the modules stored in the memory 520 and call data stored in the memory 520 to execute various functions and processing data of the terminal 500, so as to wholly monitor the mobile phone. In some implementations, the processor 580 may include one or more processing cores. In some possible implementations, the processor 580 may be integrated with an application processor and a modulation-demodulation processor, the application processor mainly processes an operating system, a user interface, an application program and the like, and the modulation-demodulation processor mainly processes wireless communication. It should be understood that the modulation-demodulation processor may not be integrated into the processor 580.

The mobile phone also includes a power supply 590 (e.g., a battery) that supplies power to various components. For instance, the power supply 590 may be logically connected to the processor 580 via a power management system to enable management of charging, discharging, and power consumption through the power management system.

Although not illustrated, the mobile phone may include a camera, a Bluetooth module, etc., and the disclosure will not elaborate herein.

Figure 5:
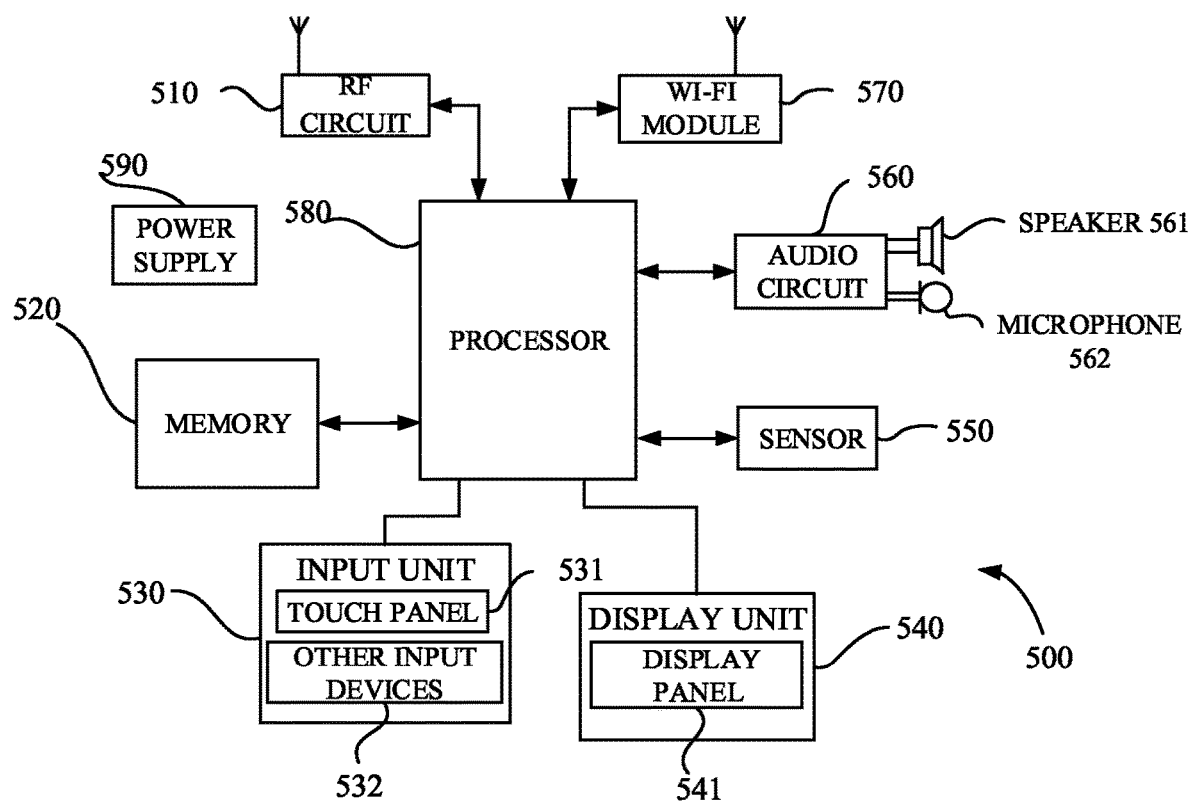
FIG. 5 is a schematic structure diagram of another terminal according to an implementation of the present disclosure.

The methods of the foregoing implementations can be implemented based on the structure of the terminal illustrated in FIG. 5.

Implementations of the present disclosure also provide a non-transitory computer storage medium. The non-transitory computer storage medium stores programs, when executed, to accomplish all or part of the operations of any of the methods described in the above-described method implementation.

Implementations of the present disclosure also provide a computer program product. The computer program product includes a non-transitory computer-readable storage medium storing computer programs. The computer programs are operable with a computer to perform all or part of the operations of any of the methods described in the above method implementations. The computer program product may be a software installation package.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), a disk or a compact disc (CD), and so on.

The implementations of the present disclosure are described in detail above, specific examples are used herein to describe the principle and implementation manners of the present disclosure. The description of the above implementations is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A method for information processing, comprising:
   detecting whether a target OAT file corresponding to a target DEX file that an application relies on is missing, in response to a start control instruction for the application detected;
   detecting existence of a backup target OAT file when the target OAT file is missing;
   determining a hard-link file configured to back up the target OAT file and reading the target OAT file from the hard-link file, when the backup target OAT file exists;
   verifying validity of the target OAT file;
   loading the target OAT file when the target OAT file is valid; and
   wherein verifying validity of the target OAT file comprises:
   determining whether the number of offset arrays of the target OAT file is equal to that of data types of the target DEX file;
   determining that the target OAT file is valid based on a determination that the number of the offset arrays of the target OAT file is equal to that of the data types of the target DEX file; and
   determining that the target OAT file is invalid based on a determination that the number of the offset arrays of the target OAT file is not equal to that of the data types of the target DEX file.

2. The method of claim 1, further comprising:
   obtaining the target OAT file by compiling the target DEX file and loading the target OAT file, when the backup target OAT file does not exist; and
   establishing the hard-link file configured to back up the target OAT file and storing the target OAT file into the hard-link file corresponding to the target OAT file.

3. The method of claim 1, further comprising:
   determining whether the target OAT file is complete when the target OAT file is invalid;
   determining uncompiled target data of the target DEX file and obtaining target compiled data by compiling the uncompiled target data, based on a determination that the target OAT file is incomplete; and
   adding the target compiled data into the target OAT file and loading the target OAT file.

4. The method of claim 2, further comprising:
   determining whether the target OAT file is complete when the target OAT file is invalid;
   determining uncompiled target data of the target DEX file and obtaining target compiled data by compiling the uncompiled target data, based on a determination that the target OAT file is incomplete; and
   adding the target compiled data into the target OAT file and loading the target OAT file.

5. The method of claim 1, further comprising:
   deleting the backup target OAT file from the hard-link file corresponding to the target OAT file when the application has been updated or uninstalled.

6. The method of claim 2, further comprising:
   deleting the backup target OAT file from the hard-link file corresponding to the target OAT file when the application has been updated or uninstalled.

7. The method of claim 3, further comprising:
   deleting the backup target OAT file from the hard-link file corresponding to the target OAT file when the application has been updated or uninstalled.

8. The method of claim 4, further comprising:
   deleting the backup target OAT file from the hard-link file corresponding to the target OAT file when the application has been updated or uninstalled.

9. A method for information processing, comprising:
   detecting whether a target OAT file corresponding to a target DEX file that an application relies on is missing, in response to a start control instruction for the application detected;
   detecting existence of a backup target OAT file when the target OAT file is missing, determining a hard-link file configured to back up the target OAT file and reading the target OAT file from the hard-link file, when the backup target OAT file exists;

verifying validity of the target OAT file;

loading the target OAT file when the target OAT file is valid;

determining whether the target OAT file is complete when the target OAT file is invalid;

determining uncompiled target data of the target DEX file and obtaining target compiled data by compiling the uncompiled target data, based on a determination that the target OAT file is incomplete; and adding the target compiled data into the target OAT file and loading the target OAT file.

10. The method of claim 6, further comprising:

obtaining the target OAT file by compiling the target DEX file and loading the target OAT file, when the backup target OAT file does not exist; and establishing the hard-link file configured to back up the target OAT file and storing the target OAT file into the hard-link file corresponding to the target OAT file.

11. The method of claim 6, further comprising:

deleting the backup target OAT file from the hard-link file corresponding to the target OAT file when the application has been updated or uninstalled.

12. The method of claim 7, further comprising:

deleting the backup target OAT file from the hard-link file corresponding to the target OAT file when the application has been updated or uninstalled.

13. A terminal, comprising:

a memory storing executable program codes; and a processor coupled with the memory;

a fingerprint recognition module, configured to collect fingerprint image;

wherein the processor is configured to call the executable program codes stored in the memory to:

detect whether a target OAT file corresponding to a target DEX file that an application relies on is missing, in response to a start control instruction for the application detected;

detect existence of a backup target OAT file when the target OAT file is missing, determine a hard-link file configured to back up the target OAT file and read the target OAT file from the hard-link file, when the backup target OAT file exists;

verify validity of the target OAT file;

load the target OAT file when the target OAT file is valid; and wherein the processor configured to call the executable program codes stored in the memory to verify validity of the target OAT file is configured to call the executable program codes stored in the memory to:

determine whether the number of offset arrays of the target OAT file is equal to that of data types of the target DEX file;

determine that the target OAT file is valid based on a determination that the number of the offset arrays of the target OAT file is equal to that of the data types of the target DEX file; and determine that the target OAT file is invalid based on a determination that the number of the offset arrays of the target OAT file is not equal to that of the data types of the target DEX file.

14. The terminal of claim 13, wherein the processor is further configured to call the executable program codes stored in the memory to:

obtain the target OAT file by compiling the target DEX file and load the target OAT file, when the backup target OAT file does not exist; and establish the hard-link file configured to back up the target OAT file and store the target OAT file into the hard-link file corresponding to the target OAT file.

15. The terminal of claim 13, wherein the processor is further configured to call the executable program codes stored in the memory to:

determine whether the target OAT file is complete when the target OAT file is invalid;

determine uncompiled target data of the target DEX file and obtain target compiled data by compiling the uncompiled target data, based on a determination that the target OAT file is incomplete; and add the target compiled data into the target OAT file and load the target OAT file.

16. The terminal of claim 14, wherein the processor is further configured to call the executable program codes stored in the memory to:

determine whether the target OAT file is complete when the target OAT file is invalid;

determine uncompiled target data of the target DEX file and obtain target compiled data by compiling the uncompiled target data, based on a determination that the target OAT file is incomplete; and add the target compiled data into the target OAT file and load the target OAT file.

17. The terminal of claim 13, wherein the processor is further configured to call the executable program codes stored in the memory to:

delete the backup target OAT file from the hard-link file corresponding to the target OAT file when the application has been updated or uninstalled.

18. The terminal of claim 14, wherein the processor is further configured to call the executable program codes stored in the memory to:

delete the backup target OAT file from the hard-link file corresponding to the target OAT file when the application has been updated or uninstalled.

19. The terminal of claim 15, wherein the processor is further configured to call the executable program codes stored in the memory to:

delete the backup target OAT file from the hard-link file corresponding to the target OAT file when the application has been updated or uninstalled.

20. The terminal of claim 16, wherein the processor is further configured to call the executable program codes stored in the memory to:

delete the backup target OAT file from the hard-link file corresponding to the target OAT file when the application has been updated or uninstalled.

* * * * *